United States Patent [19]

Tsutsui et al.

[11] Patent Number: 4,768,705

[45] Date of Patent: Sep. 6, 1988

[54] COLD/HOT WATER DISCHARGING APPARATUS

[75] Inventors: Osamu Tsutsui; Yukihiro Muroya; Hirofumi Takeuchi; Keiji Hayashi; Shingo Tanaka, all of Fukuoka, Japan

[73] Assignee: Toto Ltd., Fukuoka, Japan

[21] Appl. No.: 136,908

[22] Filed: Dec. 22, 1987

[30] Foreign Application Priority Data

Dec. 24, 1986 [JP] Japan ................. 61-310469
Dec. 29, 1986 [JP] Japan ................. 61-314167

[51] Int. Cl.⁴ .......................................... G05D 23/13
[52] U.S. Cl. ................... 236/12.12; 236/46 F; 137/624.15
[58] Field of Search ............. 236/12.12, 12.1, 12.11, 236/12.15, 12.16, 46 R, 46 F, 47, 93 B, 78 D; 4/597, 542, 598; 137/468, 337, 341, 334, 624.11, 624.13, 624.15, 624.2, 605, 606, 607

[56] References Cited

U.S. PATENT DOCUMENTS 3,721,386 3/1973 Brick et al. .................. 236/12.12
4,322,031 3/1982 Gehlert ........................ 236/12.1
4,501,261 2/1985 Tsutsui et al.
4,674,678 6/1987 Knebel et al. ................ 236/12.12

FOREIGN PATENT DOCUMENTS 2143343 2/1985 United Kingdom ............. 236/12.12

Primary Examiner—Harry B. Tanner
Attorney, Agent, or Firm—Sandler & Greenblum

[57] ABSTRACT

This invention relates to a cold/hot water discharging apparatus which is used for cold/hot water massage shower, and the like. In order to alternately switch and supply hot water of a predetermined temperature supplied from a hot water source to a discharge portion, a valve of a cold/hot water mixing tap is driven by a motor and is reciprocated in a pre-set period between a position where high temperature hot water is discharged and low temperature hot water is discharged. In each of the periods for discharging low/high temperature hot water, an optimum gain of this period is determined from the previous period and previous gain so as to shorten the discharge period of cold/hot water and to obtain a stable curve of the discharge hot water.

14 Claims, 12 Drawing Sheets

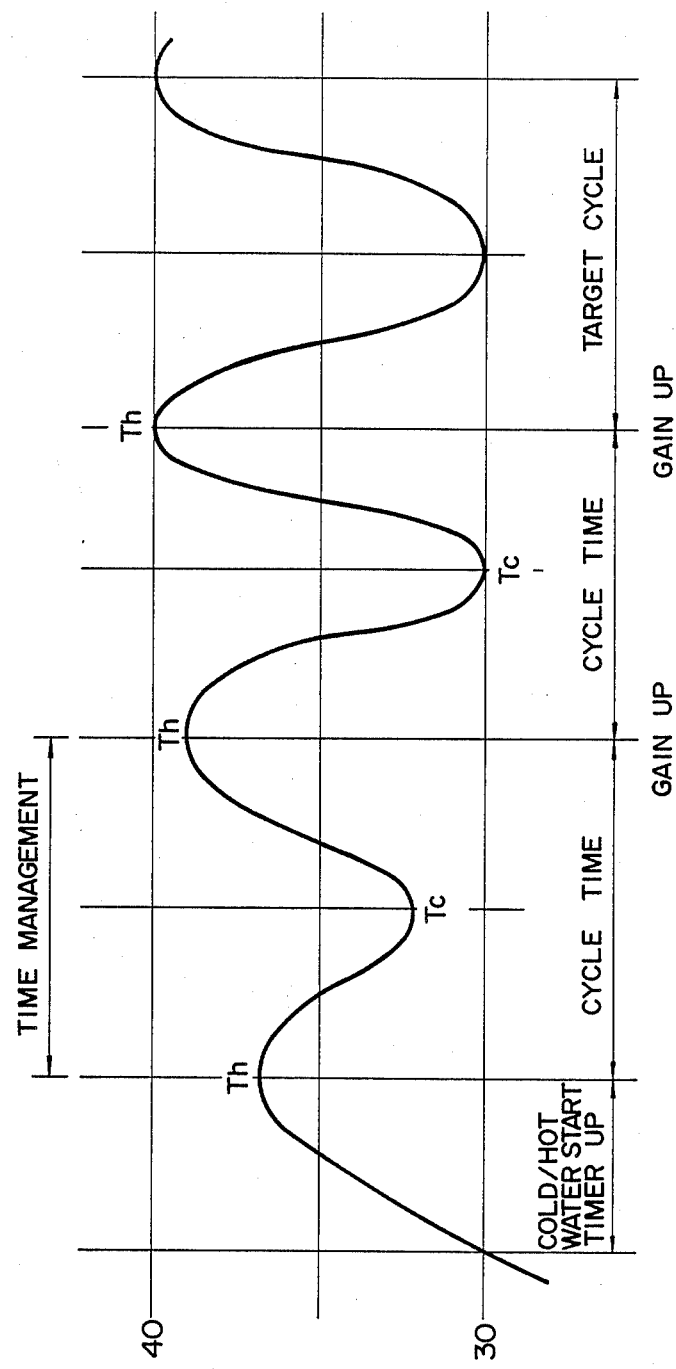

COLD/HOT WATER DISCHARGING APPARATUS

BACKGROUND OF THE INVENTION

1. Field of the Invention

This invention relates to a cold/hot water discharging apparatus which discharges alternately hot water having a high temperature and hot water having a low temperature from a discharge portion so as to obtain a massage effect. More particularly, the present invention relates to a cold/hot water discharging apparatus which switches and regulates alternately hot water of a predetermined temperature supplied from a hot water supply source to mixed hot water having a high temperature and to mixed hot water having a low temperature by a cold/hot water mixing tap and supplies them to a discharge portion.

2. Description of the Prior Art

Conventional cold/hot water discharging apparatuses can be classified into a system which switches alternately the temperature of hot water supplied from a hot water supply machine to high and low temperatures and supplies directly hot water supplied from this hot water supply machine to a discharge portion, and a system which mixes high temperature hot water supplied from a hot water supply machine with cold water by a cold/hot water mixing tap to obtain mixed hot water having a predetermined temperature and supplies alternately this mixed hot water and cold water supplied from a feed water source to the discharge portion through a valve capable of alternately switching the inflow sides.

However, the inventors of the present invention developed a cold/hot water discharging apparatus of a novel system which is entirely different from the prior art systems described above.

Namely, the cold/hot water discharging apparatus in accordance with the present invention is of the system wherein hot water of a predetermined temperature supplied from a hot water supply machine is switched and regulated alternately to mixed hot water of a high temperature and mixed hot water of a low temperature by a cold/hot water mixing tap and supplied to a discharge portion. More definitely, in the apparatus of the present invention, a valve of the cold/hot water mixing tap is driven by a motor and is controlled in such a manner as to reciprocate between a position at which high temperature hot water is to be discharged and a position at which low temperature hot water is to be discharged in a predetermined period.

In this cold/hot water discharging apparatus, the temperatures and periods of low temperature hot water and high temperature hot water are controlled by the speed of the valve and this speed is determined by the difference between an actual temperature and a target temperature and by a gain.

However, if the gain is constant in the cold/hot water discharging apparatus described above, there is the problem in that a stable curve of output hot water having a short cold/hot water discharge period cannot be obtained at the time of pressure fluctuation, and so forth.

For, an optimum gain varies with the temperatures of cold/hot water and with the pressure.

SUMMARY OF THE INVENTION

In a cold/hot water discharging apparatus of the type wherein a valve of a cold/hot water mixing tap is driven by a motor and the valve is reciprocated between a set position at which high temperature hot water is to be discharged and a set position at which low temperature hot water is to be discharged in a set period, the object of the present invention is to shorten the discharge periods of cold/hot water and to obtain a stable curve of output hot water by determining an optimum gain of the period of this time from a previous period (period length) and previous gain in each of the cold/hot water discharge periods.

The cold/hot water discharging apparatus in accordance with the present invention comprises a cold/hot water mixing tap having the primary side thereof communicated with a feed water source and a hot water supply source and the secondary side thereof communicated with a discharge portion and equipped with a motor whose rotating speed is variable in accordance with a control signal and which drives the valve to control the mixing ratio of cold/hot water; mixed water temperature detection means disposed on the secondary side of the cold/hot water mixing tap; memory means for storing set temperatures and target periods for discharging low temperature hot water and for discharging high temperature hot water, respectively; cold/hot water switch means for switching and setting alternately the set temperature to a target temperature for discharging low temperature hot water and to a target temperature for discharging high temperature hot water, comparing the mixed water temperature detected by the mixed water temperature detection means with one of the target temperatures set this time and switching and setting the set temperature to the other of the target temperatures when the mixed hot water temperature reaches the target temperature or its approximate value; motor speed setting means for calculating the rotating speed of the motor from the difference between the mixed hot water temperature and the target temperature and from a gain in each of the discharge periods of low temperature hot water and high temperature hot water, and delivering a control signal in accordance with the result of calculation; and gain setting means for setting the gain as a factor for calculating the motor speed in the period of this time from the gain inputted as the calculation factor, the previous period and the target period when the motor speed is calculated in this period in each of the discharge periods of low and high hot temperature hot water.

In accordance with the present invention, since the optimum gain of the present period is determined from the previous cold/hot water periods and gain so as to control the rotating speed of the motor, it becomes possible to obtain stably cold/hot water in the target period under any cold/hot water condition.

Though the first embodiment described above can substantially eliminate the problems of the prior art technique and can be put into practical application, the problem is yet left unsolved in that the cold/hot water period gets elongated at the initial stage.

In a cold/hot water discharging apparatus of the type wherein a valve of a cold/hot water mixing tap is driven by a motor and controlled in such a manner as to reciprocate between a set position at which high temperature hot water is to be discharged and a set position at which low temperature hot water is to be reciprocated in a predetermined period, it is the second object of the present invention to provide a cold/hot water discharging apparatus wherein a target temperature is switched from a target temperature for low temperature hot water to a target temperature for high temperature hot water and vice versa in order to shorten a half period after the passage of a predetermined period of time through time management even if the temperature does not yet reach the target temperature for low/high temperature hot water.

The cold/hot water discharging apparatus in accordance with the present invention directed to accomplish the second object described above comprises a cold/hot water mixing tap having the secondary side thereof communicated with a feed water source and a hot water supply source and the secondary side thereof communicated with a shower and equipped with a motor whose rotating speed is variable in accordance with a control signal and which drives a motor so as to control the mixing ratio of cold/hot water; mixed water temperature detection means disposed on the secondary side of the cold/hot water mixing tap; a cold/hot water start timer, a half period time count-down timer and a period inputting count-up timer; memory means for storing the target temperatures for discharging low and high temperature hot water set by a controller, and their target periods, respectively; cold/hot water switch means for switching and setting alternately the target temperature to a target temperature for discharging low temperature hot water and to a target temperature for discharging high temperature hot water, comparing the mixed hot water temperature detected by the mixed water temperature detection means with one of the target temperatures set this time and switching and setting the target temperature to the other of the target temperatures when the mixed water temperature reaches the target temperature thereof or its approximate value or when a predetermined period of time has passed; motor speed setting means for calculating the rotating speed of the motor from the difference between the mixed water temperature of the previous period and the target temperature and from the gain in each of the discharge periods of low and high temperature hot water, and delivering a motor control signal in accordance with the result of calculation; and gain setting means for calculating an optimum gain as the motor speed calculation factor of this period from the previous periods for discharging low and high temperature hot water, the target periods, the previous temperature width, the target temperature width and the gain inputted as the calculation factor in the motor speed calculation in the previous period.

In accordance with the second embodiment of the present invention described above, since the operation of the motor is controlled not only on the basis of the gain of the previous period but also through time management, the cold/hot water period is prevented from becoming much long but is shifted to the next period so that the initial period becomes short and satisfactory cold/hot water discharging apparatus can be obtained.

Since the temperature width is used as one of the gain calculation factors, the problem that the optimum gain cannot be obtained quickly through time management can be solved, and the optimum gain can be obtained rapidly.

Therefore, cold/hot water can be stably from the initial stage of cold/hot shower discharge in the target period under any cold/hot water condition.

The cold/hot water shower of the present invention exhibits an excellent effect for local washing or cleaning.

The cold/hot water discharging apparatus of the present invention can be used as a cold/hot water message shower apparatus or a local washing or cleaning apparatus. The target temperature of low temperature hot water is from 25° to 30° C. and preferably 30° C., while the target temperature of high temperature hot water is from 36° to 43° C. and preferably 40° C.

The above and other objects and novel features and advantages of the present invention will become more apparent from the following detailed description when taken in conjunction with the accompanying drawings.

BRIEF DESCRIPTION OF THE DRAWINGS

FIG. 13 is a diagram useful for explaining the relationship between the cold/hot water temperature and the period with the passage of time in the second embodiment of the invention.

DESCRIPTION OF THE PREFERRED EMBODIMENTS

First of all, the first embodiment of the present invention will be described with reference to the accompanying drawings.

Figure 1:
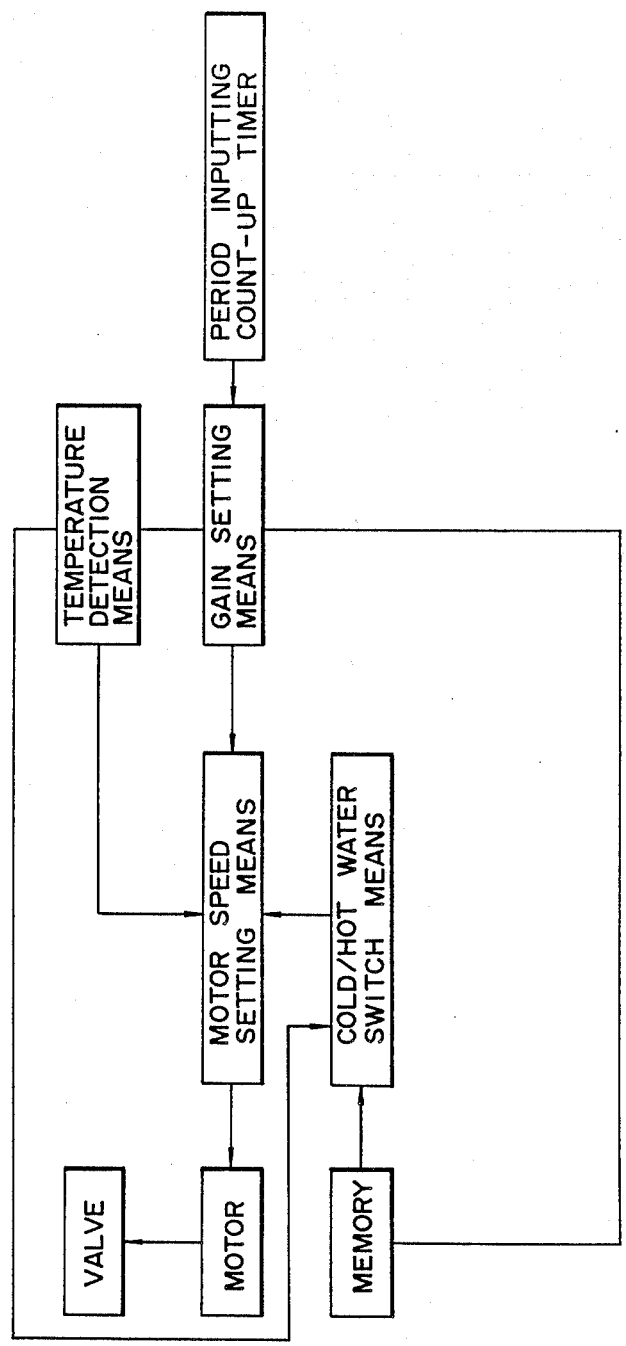
FIG. 1 is a block diagram showing the overall construction of a cold/hot water discharging apparatus in accordance with the present invention.
Figure 2:
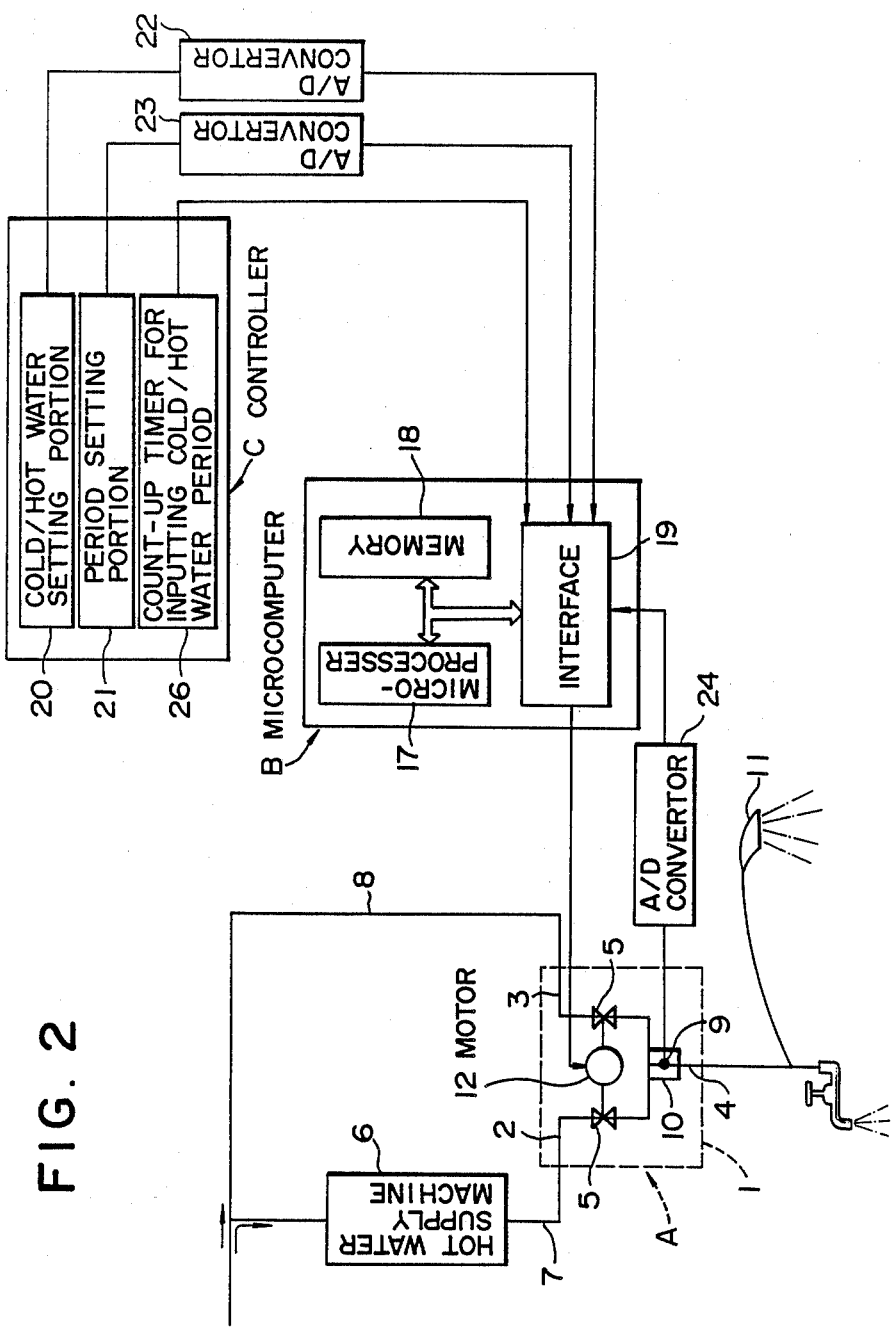
FIG. 2 is a block diagram useful for explaining the first embodiment of the invention.
Figure 3:
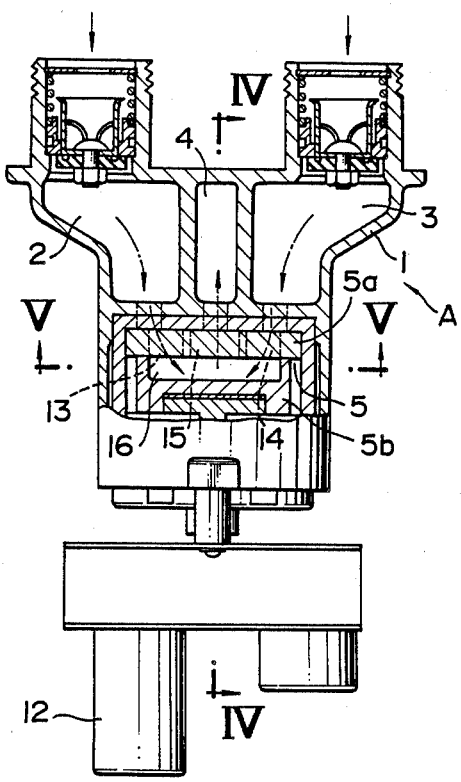
FIG. 3 is a sectional view showing an example of the definite structure of a cold/hot water mixing tap.
Figure 4:
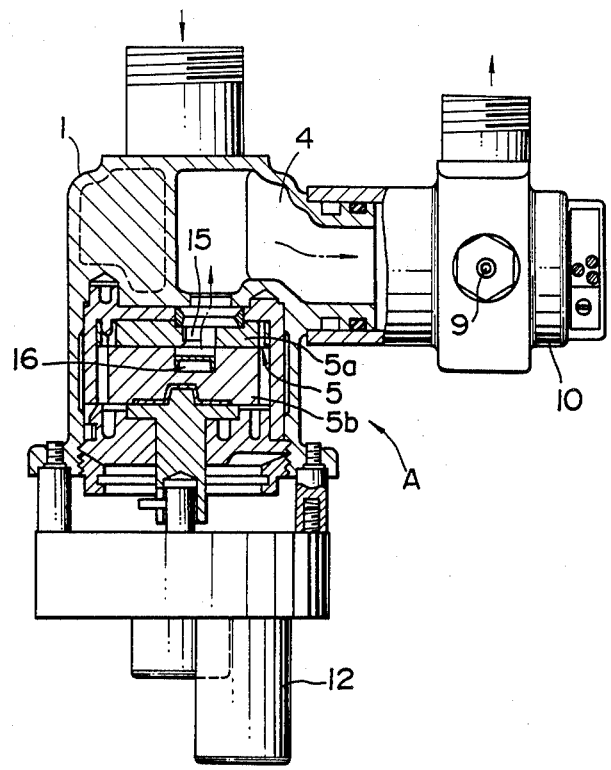
FIG. 4 is a sectional view taken along line IV—IV of FIG. 3.
Figure 5:
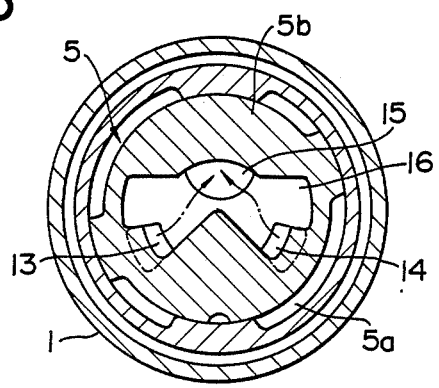
FIG. 5 is an enlarged sectional view taken along line V—V of FIG. 3.

In FIG. 2, symbol A represents a cold/hot water mixing tap. A hot water passage 2, a cold water passage 3, and a mixed water passage 4 are defined inside the main body 1 of this tap. The hot water passage 2 and the cold water passage 3 are communicated with the mixed water passage 4 through a valve 5.

The hot water passage 2 is connected to a hot water supply pipe 7 communicating with the outlet side of a hot water supply machine 6 while the cold water passage 3 is connected to a feed water piping arrangement 8 as a cold water supply source. A shower 11 is connected to the hot water passage 4 through a sensor unit 10 which is equipped with a thermistor type temperature sensor 9.

The valve 5 consists of a fixed disc 5a which is fixed to the main body 1 in such a manner as to be unable to rotate and a movable disc 5b which is superposed with the fixed disc 5a water-tight and slidably. The movable disc 5b is rotated normally and reversely by a motor 12.

Both the fixed disc 5a and the movable disc 5b are made of ceramics. The fixed disc 5a is equipped with a hot water port 13 communicating with the hot water passage 2, a cold water port 14 communicating with the cold water passage 3 and mixed water port 15 communicating with the mixed water passage 4. These ports 13-15 are bored in such a manner as to penetrate through the fixed disc 5a in the direction of its thickness. The movable disc 5b is equipped with a mixing chamber 16 which controls the communication with the hot water port 13, the cold water port 14 and the mixed water port 15 and is defined as a recess on its slide surface with the fixed disc 5a.

Among the hot water port 13, the cold water port 14, the mixed water port 15 and the mixing chamber 16, the mixing chamber 16 does not mate with any of the hot water port 13 and the cold water port 14 and cuts off the communication of these ports 13, 14 with the mixed water port 15 when the movable disc 5b is at the closing position of the valve, but as the movable disc 5b rotates normally, the mixing chamber 16 matches first with the cold water port 14 and communicates the cold water port 14 with the mixed water port 15. As the movable disc 5b rotates further, the matching area of the mixing chamber 16 with the cold water port 14 increases and after the cold water port 14 opens fully, the mixing chamber 16 starts matching with the hot water port 13 and communicates both the cold water port 14 and the hot water port 13 with the mixed water port 15.

The matching area of the mixing chamber 16 with the cold water port 14 decreases in inverse proportion to the increase of the matching area of the mixing chamber 16 with the hot water port 13. Finally, the mixing chamber 16 does not match with the cold water port 14 any longer but matches only with the hot water port 13 and opens it fully. In other words, the shape and disposition of the cold/hot water mixing tap A are determined in such a manner as to permit the operations described above as represented by the example shown in the drawing.

When the motor 12 is driven to rotate the movable disc 5b alternately in the normal and reverse directions while the mixing chamber 16 matches with both the cold water port 14 and the hot water port 13, this cold/hot water mixing tap A can supply the low temperature hot water and the high temperature hot water to the shower 11.

The motor 12 is controlled by the microcomputer B.

The microcomputer B consists principally of a microprocessor, a memory 18 and an interface 19.

The set temperatures for discharging low temperature hot water and high temperature hot water and the target periods of both cold and hot water are inputted as analog signals to the interface 19 of the microcomputer B from a cold/hot water setting portion 20 and period setting portion 21 of the controller C and these signals are inputted to, and stored in, the memory 18 as digital signals through A/D convertors 22, 23, respectively. The temperature of mixed water flowing through the mixed water passage 4 of the cold/hot water mixing tap A is detected as an analog signal by the temperature sensor 9 and inputted to the interface 19 through an A/D convertor 24. A signal from a count-up timer 26 for inputting the cold/hot water period is inputted to the interface 19.

The microcomputer B executes various processings on the basis of the external data thus inputted to the interface 19 in accordance with the program stored in ROM of the memory 18, sends the control signal to the motor 12 and controls driving of the motor 12.

Figure 6:
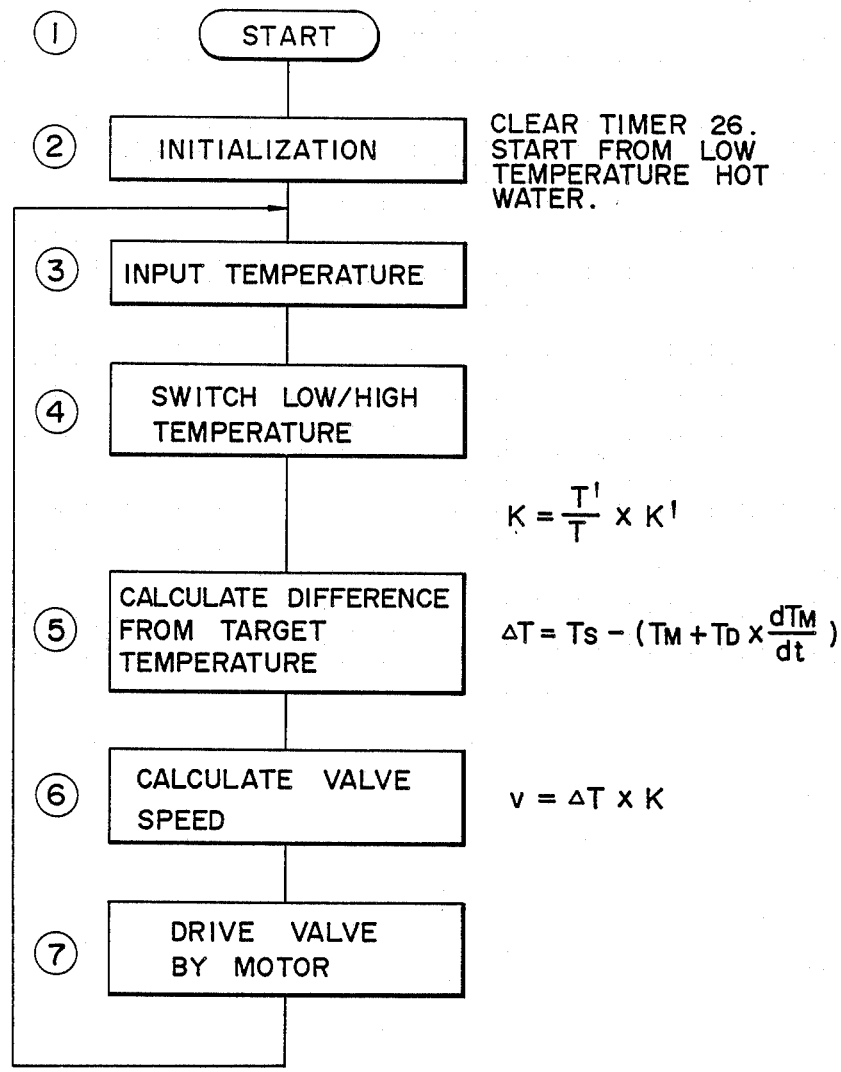
FIGS. 6 and 7 are flowcharts useful for explaining the software of a microcomputer in the first embodiment of the invention.
Figure 7:
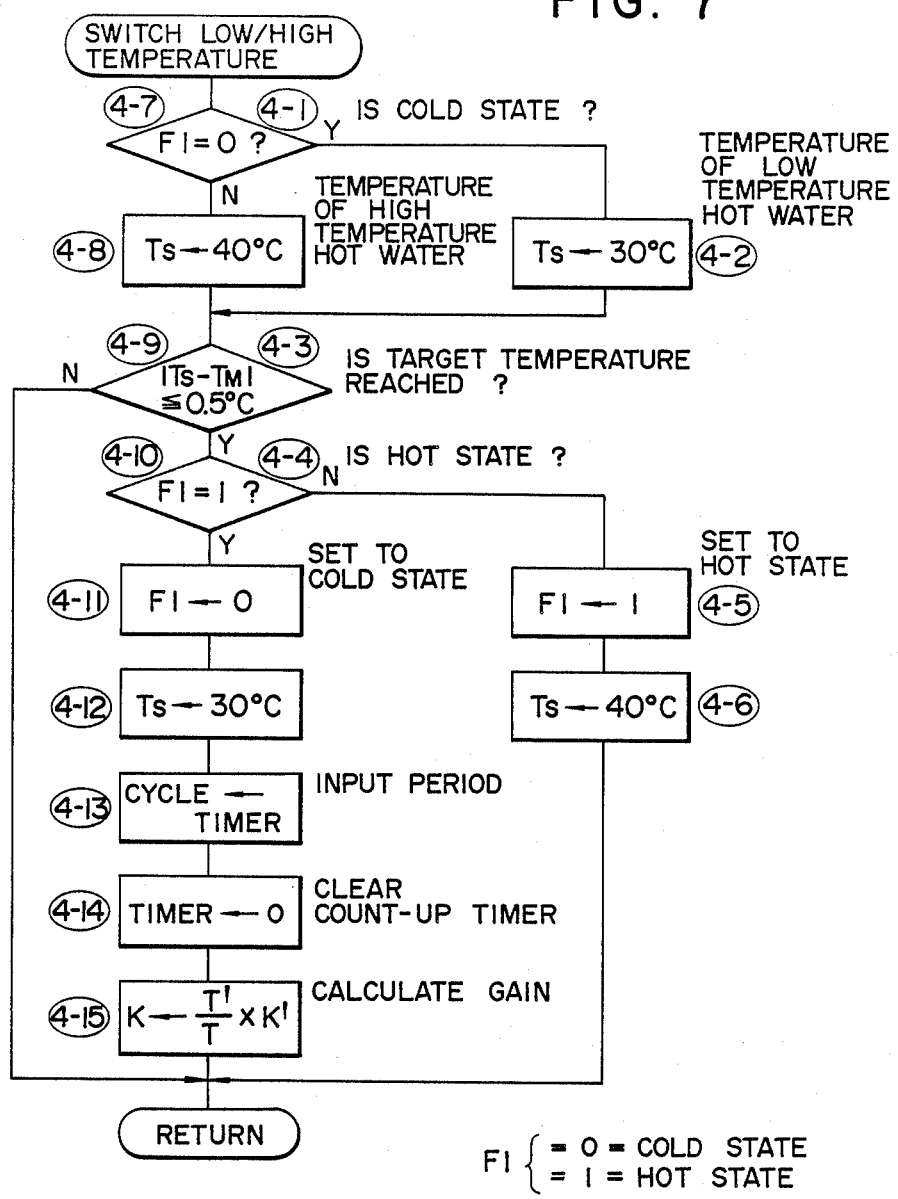
Figure 8:
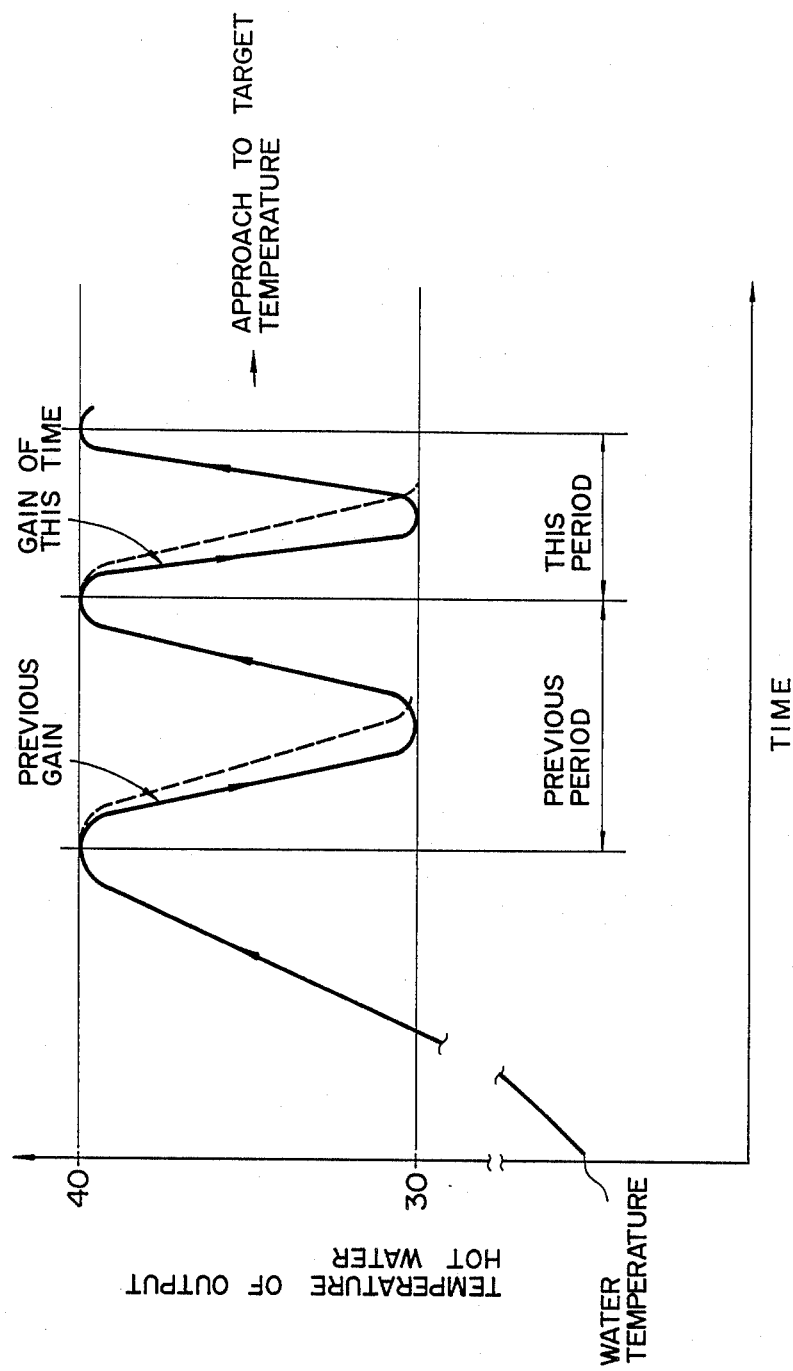
FIG. 8 is a diagram useful for explaining the relationship between the temperatures of cold/hot water and the period with the passage of time, wherein solid line represents the cold/hot water period controlled by the apparatus of the present invention and dash line does the cold/hot water period controlled on the basis of a fixed gain.
Figure 9:
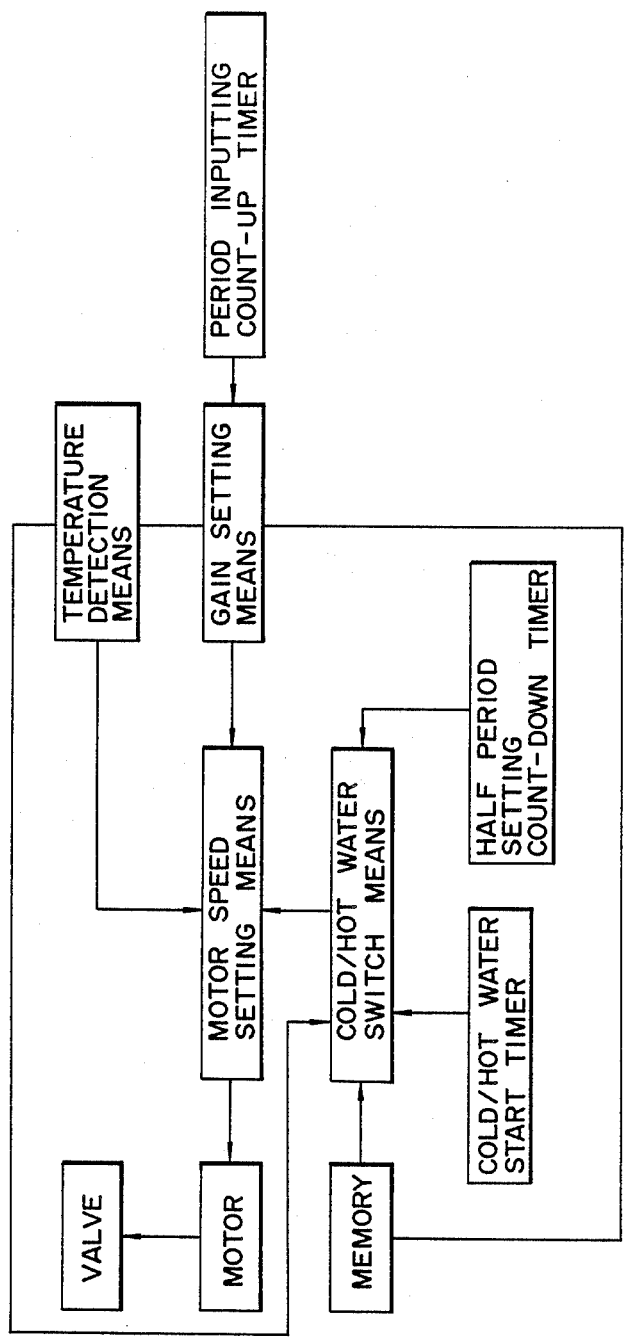
FIG. 9 is a block diagram showing part of the cold/hot water discharging apparatus in accordance with the second embodiment of the invention.

FIGS. 6 and 7 show the flowcharts of the program stored in ROM. Solid line in FIG. 8 represents the relationship between the period of the cold/hot water temperature and the time when the motor 12 is operated in accordance with this program.

Here, the action of the cold/hot water massage shower apparatus in accordance with the present invention will be described about the case where the cold/hot water temperatures are set to low temperature hot water 30° C. and to high temperature hot water 40° C., by way of example, with reference to FIGS. 6 and 7. Reference numerals ① through ⑦ in the flowcharts represent each step of the flowcharts.

When the program is started, the microcomputer B first clears the timer 26 at the step ② and executes initialization processing so that the period of cold/hot water is started from low temperature hot water. Next, the motor 12 is driven to open the valve 5 and the detection temperature of water flowing through the mixed water passage 4 is inputted from the temperature sensor 9 at the step ③ microcomputer B executes cold/hot water switching at the step ④.

The cold/hot water switch control is carried out by the cold/hot switch program (FIG. 7).

In accordance with the cold/hot switch program, the microcomputer B determines whether the state is one where low temperature hot water is to be discharged (hereinafter called the "cold state") or the state where high temperature hot water is to be discharged (hereinafter called the "hot state") at the step 4-1. Under the cold state (the state is naturally judged as the cold state because the operation is initialized so as to start from the cold state at the step ② described above), the motor 12 is driven so as to rotate the movable disc 5b in the direction of low temperature hot water having a target temperature, that is, in the direction where 30° C. mixed water is discharged (in the normal rotating direction). Subsequently, whether or not the target temperature is reached is confirmed at the step 4-3. (In practice, whether or not the difference between the target temperature TS and the detection temperature TM by the temperature sensor 9 is below 0.5° C. is confirmed.) When the target temperature is reached, whether the hot state or the cold state is confirmed at the step 4-4 and since the hot state is not yet reached, the state is set to the hot state at the step 4-5. In other words, the target temperature is switched from 30° C. for discharging low temperature hot water to 40° C. for discharging high temperature hot water and the motor 12 is driven so as to rotate the movable disc 5b of the valve 5 in such a direction as to discharge 40° C. mixed water (in the normal rotating direction) at the step 4-6.

Next, whether or not the cold state is attained is confirmed at the step 4-7. However, since the state is switched to the hot state at the step 4-5 described above, the judgement at this step 4-7 does not result in the cold state. Therefore, the motor 12 is driven so as to continuously rotate the movable disc 5b in such a direction as to discharge 40° C. mixed water at the step 4-8.

Whether or not the target temperature 40° C. is attained is confirmed at the step 4-9 and when the target temperature is reached, whether or not the state is yet the hot state is judged at the step 4-10. If the state is found out as the hot state (since the state is not switched again after the switch to the hot state at the step 4-5, the hot state is confirmed at this step 4-10), the state is switched to the cold state at the step 4-11. In other words, the target temperature is switched from 40° C. for discharging high temperature hot water to 30° C. for discharging low temperature hot water, and the motor 12 is driven so as to rotate the movable disc 5b of the valve 5 in such a direction as to discharge 30° C. mixed water (in the reverse rotating direction) at the step 4-12.

Next, the timer 26 inputs the period so far at the step 4-13 and is then cleared at the step 4-14. At the subsequent step 4-15, the gain K of the next period is calculated from the period T' inputted at the step 4-13, the target period T that is in advance stored and the gain K:

$$K = \frac{T'}{T} \times K'$$

The flow returns to the step 4-1 once again and each of the steps (4-1 to 4-15) described above is repeated.

The gain K as the factor for calculating the next gain K at the step 4-15 uses a predetermined constant at the start of the cold/hot water switch program, but from the second period of the cold/hot water discharge period and so on, the gain K of the previous period calculated at the step 4-15 is used.

In the overall program, on the other hand, the difference between the actual temperature at the time of discharge of low/high temperature hot water of cold/hot water and the target temperature is calculated at the step ⑤:

$$\Delta T = TS - \left( TM + TD \cdot \frac{dTM}{dt} \right)$$

where TD is a constant.

At the next step ⑥, the speed v of the valve 5 is calculated from the ΔT calculated at the step ⑤ and the target temperature and the gain K calculated at the step 4-15 in accordance with the following equation:

$$v = \Delta T \times K$$

The driving speed of the motor 12 is controlled in accordance with the speed v thus obtained.

Figure 10:
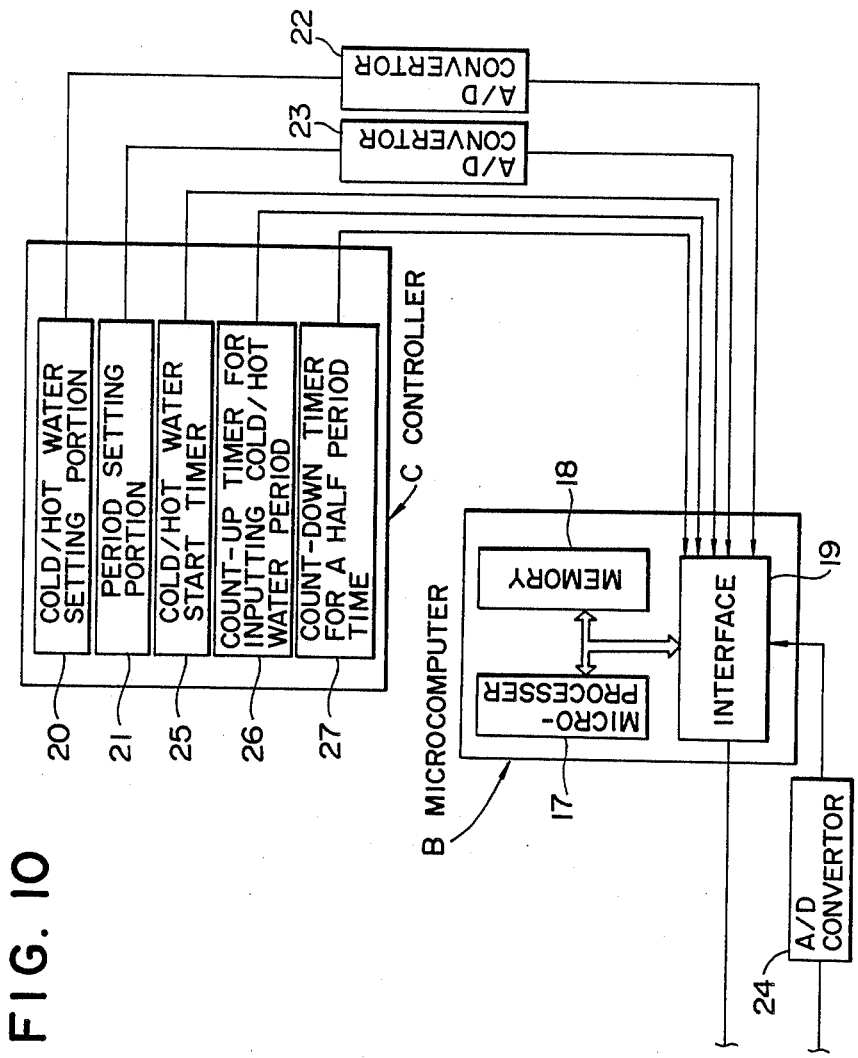
FIG. 10 is a block diagram useful for explaining the second embodiment.

Next, FIGS. 9 to 13 show the second embodiment of the present invention. The cold water supply source and the hot water supply source on the primary side, the motor drive type cold/hot water mixing tap, its mixed water temperature detection means and the cold/hot water supply source on the secondary side are the same as the hardware construction of the first embodiment and are therefore omitted from the drawing, and like reference numerals are used to identify like constituents to avoid repetition of explanation of such constituents (FIG. 10).

This second embodiment is characterized in that a cold/hot water start timer and a count-down timer for a half period time are added to the first embodiment.

In other words, in addition to the signals from the afore-mentioned cold/hot water setting portion 20, period setting portion 21 and count-up timer 26 for inputting cold/hot water period, signals from the three timers including the timer 25 for the cold/hot water start, the timer 26 and the count-down timer 27 for setting the half period are also inputted to the interface 19 of the microcomputer B.

The setting portions 20, 21 and the timers 25, 26, 27 described above are assembled in the controller C.

The microcomputer B executes the processing on the basis of the external data inputted to its interface 19 in accordance with the program stored in ROM of the memory 18 and sends the control signal to the motor 12 to control its operation.

Figure 11:
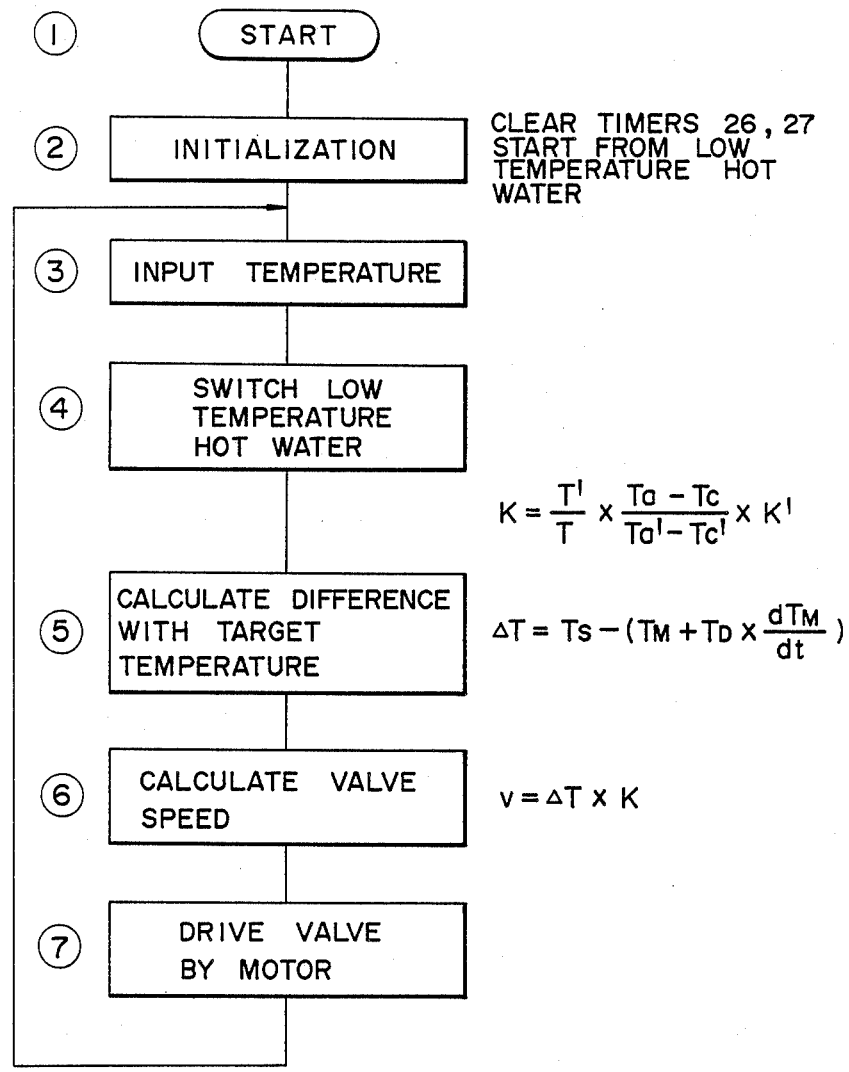
FIGS. 11 and 12 are flowcharts useful for explaining the software of a microcomputer in the second embodiment of the invention.
Figure 12:
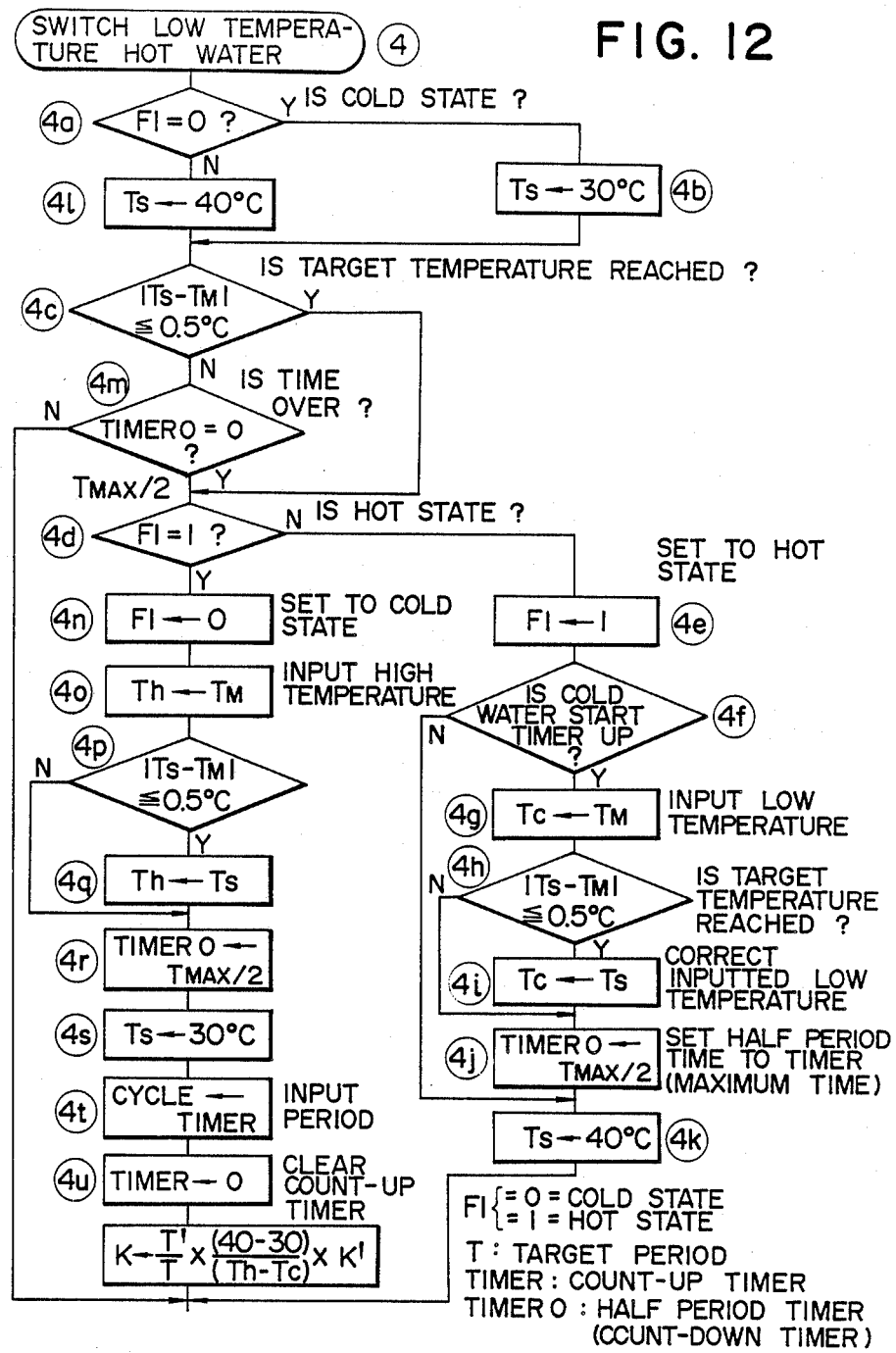

FIGS. 11 and 12 show the flowcharts of the program stored in ROM.

Here, the action of the cold/hot water massage shower apparatus of the present invention will be explained about the case where low temperature hot water is 30° C. and high temperature hot water is 40° C., by way of example, with reference to FIGS. 11 and 12. Incidentally, reference numerals ① to ⑦ in the drawings represent each step.

When the program is started, the microcomputer B executes initialization processing at the step ②. It sets the period of the cold/hot water to low temperature hot water or in other words, clears each timer 25, 26, 27 so as to start from the cold state.

Subsequently, the motor 12 is driven to open the valve 5, and the detection temperature of water flowing through the mixed water passage 4 from the temperature sensor 9 is inputted at the step ③. Then, the microcomputer B executes cold/hot switch control at the step ④.

The cold/hot switch control described above is executed in accordance with the cold/hot switch program (FIG. 12).

The microcomputer B confirms whether the state is one where low temperature hot water is to be discharged (hereinafter called the "cold state") or the state where high temperature hot water is to be discharged (hereinafter called the "high state") at the step ④a and when the state is judged as the cold state (the state is judged as the cold state at this step because initialization is made in such a manner as to start from the cold state at the step ②), the motor 12 is driven so as to rotate the movable disc 5b in such a direction where mixed water having the target temperature for low temperature hot water, that is, 30° C., is discharged (in the normal rotating direction). Subsequently, whether or not the target temperature is reached is confirmed at the step ④c, (In practice, whether or not the difference between the target temperature TS and the detection temperature TM by the temperature sensor 9 is below 0.5° C. is confirmed.) If the target temperature is attained, whether the state is the hot state or the cold state is confirmed at the step ④d and if it is not yet the hot state, the state is set to the hot state at the step ④e. In other words, the target temperature is switched from 30° C. for discharging low temperature hot water to 40° C. for discharging high temperature hot water.

At the step ④f, whether or not the time of the cold/hot start timer 25 is up is confirmed and when it is, the actual cold temperature is inputted at the step ④g and whether the temperature reaches the target temperature of the cold state, that is, whether or not the difference between the target temperature 30° C. and the actual cold temperature is within the range of below 0.5° C., is confirmed at the step ④h. If the actual cold temperature thus taken into is within the range described above, the cold temperature is corrected from 29.6° C., for example, to 30° C. at the step ④i and the half period time is set to the half period time count-down timer 27 at the step (4j). Then, the motor 12 is driven so as to rotate the movable disc 5b in such a direction as to discharge 40° C. mixed water (in the normal rotating direction) at the step (4k). If the difference between the target temperature 30° C. and the actual cold temperature is confirmed to be out of the range of below 0.5° C. at the step (4b) described above, the step (4i) is skipped, the flow proceeds to the step (4j) and the half period time count-down timer 27 is set.

On the other hand, if time-up of the cold/hot water start timer is not confirmed at the step (4f), the flow proceeds to the step (4k) by skipping the steps (4g)-(4j) and the motor 12 is driven so as to rotate the movable disc 5b in such a direction as to discharge 40° C. mixed water.

Subsequently, the flow returns once again to the step (4a) and whether the state is the cold state or the hot state is confirmed. However, since the state is set to the hot state at the step (4e), the motor 12 is driven continuously to rotate the movable disc 5b in such a direction as to discharge the 40° C. mixed water at the step (4l).

Whether the target temperature is reached or in other words, whether the difference between the target temperature 40° C. and the mixed water temperature detected by the temperature sensor 9 is below 0.5° C., is confirmed once again at the step (4c) and if not, whether or not the half period time count-down timer 27 is zero or whether or not the half period time set by the count-down timer 27 is over is confirmed at the step (4m).

When the mixed water temperature reaches the target temperature or when the half period time is over even if the mixed water temperature does not reach the target temperature, whether or not the state is the hot state is confirmed at the step (4d) and if the state is the hot state (the hot state is confirmed at the step (4d) because the state is switched to the hot state at the step (4e)), the state is switched to the cold state at the step (4r). In other words, the target temperature of the cold/hot water is switched from 40° C. to 30° C.

Subsequently, the actual temperature of the hot state is inputted at the step (4o) and whether the actual temperature approaches to the range of below 0.5° C. with respect to the target temperature 40° C. of the hot state and if it does, the inputted temperature, e.g. 39.6° C., is corrected to 40° C. at the step (4q). If the inputted actual temperature does not yet approach to the target temperature, the flow proceeds to the step (4r), where the half period time timer is set, while skipping the step (4q).

Next, the motor 12 is driven so as to rotate the movable disc 5b in such a direction as to discharge 30° C. mixed water (in the reverse rotating direction) at the step (4s), and one-period time is inputted from the count-up timer 26 for the cold/hot water period at the step (4t). This timer 26 is cleared at the step (4u) and the optimum gain of this period is calculated at the step (4v).

In other words, the optimum gain K of this period is calculated at the step (4v) on the basis of the target temperature TS for discharging the low/high temperature cold/hot water set by the setting portions 20, 21 of the controller C, the target period T, the cold water temperature Tc inputted at the step (4g), the hot water temperature Th inputted at the step (4o) and the gain K' of the previous period T' in accordance with the following equation:

$$\frac{\text{previous period}}{\text{target period}} \times \frac{\text{target temperature width}}{\text{temperature width of previous period}} \times \text{previous gain} =$$

$$\frac{T'}{T} \times \frac{40 - 30}{Th - Tc} \times K'$$

The flow of this cold/hot temperature switch program returns once again to the step (4a) and each of the steps (4a) - v is repeated.

The gain K' as one of the factors for calculating the gain of this period at the step (4v) described above uses a predetermined constant at the start of the cold/hot switch program but from the second cold/hot water discharge period and so one, the gain K of the previous period calculated at the step (4v) is used as the gain K'.

On the other hand, in the overall program shown in FIG. 11, the difference ΔT between the target temperature Ts and the actual discharge temperature TM detected by the temperature sensor 9 is calculated in accordance with the following equation at the step (5) in succession to the step (4):

$$\Delta T = Ts - \left( TM + TD \cdot \frac{dTM}{dt} \right)$$

where TD is a constant.

Then, the rotating speed of the valve 5 is calculated at the step (6) on the basis of the difference ΔT between the target temperature and the actual discharge temperature calculated at the step (5) and the optimum gain K of this period calculated at the step (4v) in accordance with the following equation:

$$V = \Delta T \times K$$

The necessary control signal is delivered on the basis of this rotating speed to the motor 12 to control the motor 12 in this period at the step (6).

FIG. 13 shows the relationship between the cold/hot water temperature and the cold/hot water period with the passage of time when the operation of the motor 12 is controlled in accordance with the program described above.

As can be seen from this diagram, the period shifts to the next period after the passage of a predetermined period at the initial stage of the cold/hot water discharge even if the cold/hot water temperature does not reach the target temperature, and the initial period does not get elongated.

Though the present invention has thus been described definitely with reference to the preferred embodiments thereof, the invention is not particularly limited thereto but can be changed or modified in various manners without departing from the spirit and scope thereof.

What is claimed is:

1. A cold/hot water discharging apparatus for changing and regulating alternately hot water of a predetermined temperature supplied from a hot water supply source to high temperature mixed water and low temperature mixed water by a cold/hot water mixing tap and supplying them to a discharge portion, said apparatus comprising:
   (a) a cold/hot water mixing tap having the primary side thereof communicated with a cold water supply source and a hot water supply source and the secondary side thereof communicated with a discharge portion;
(b) a motor having a variable rotating speed in accordance with a control signal and driving a valve of said mixing tap to control the mixing ratio of cold/hot water;
(c) temperature detection means for detecting the temperature of mixed water, disposed on the secondary side of said mixing tap;
(d) memory means for storing the set temperatures for discharging low temperature hot water and for discharging high temperature hot water, respectively, and for storing a target period;
(e) a count-up timer for inputting the period;
(f) cold/hot water switch means for switching the set temperature to a target temperature for discharging low temperature hot water and to a target temperature for discharging high temperature hot water, comparing the mixed hot water temperature detected by said temperature detection means with one of said target temperatures and switching and setting the set temperature to the other of said target temperatures when the mixed hot water temperature reaches said target temperature or an approximate value thereof;
(g) motor speed setting means for calculating the rotating speed of a motor on the basis of the difference between the mixed hot water temperature and said target temperature in each of the discharge periods of low temperature hot water and high temperature hot water and a gain, and delivering a control signal in accordance with the result of calculation; and
(h) gain setting means for calculating an optimum gain as a factor for calculating the motor speed of this period from the gain inputted as the calculation factor in the calculation of the motor speed in the previous period of the discharge periods of low and high hot water, the target period and the previous period.

2. The cold/hot water discharging apparatus as defined in claim 1, wherein said valve of said mixing tap consists of a fixed disc and a movable disc superposed with said fixed disc water-tight and slidably, and said motor is capable of rotation in both normal and reverse directions and is rotated and reciprocated between a position at which high temperature hot water is discharged and a position at which low temperature hot water is discharged.

3. The cold/hot water discharging apparatus as defined in claim 1, wherein said cold/hot water discharging apparatus is used as a shower apparatus or a local washing apparatus.

4. The cold/hot water discharging apparatus as defined in claim 1, wherein said cold/hot water discharging apparatus is a shower apparatus, and operates the following steps:
(1) an initial step of clearing a count-up timer for inputting a period and starting the period of cold/hot water from low temperature hot water;
(2) a step of opening said valve by the operation of said motor and inputting the temperature of mixed hot water detected by said temperature detection means;
(3) a step of alternately switching the set temperature to the set temperature for discharging low temperature hot water and the set temperature for discharging high temperature hot water by said cold/hot water switch means in cooperation with said temperature detection means, and calculating the gain K of the next period in each of the periods of discharging cold/hot water by said gain setting means from the previous period T', the target period T and the gain K' in accordance with the following equation:

$K = (T'/T \times K')$ (4) a step of calculating the difference $\Delta T$ between the actual temperature TM and the target temperature TS at the time of discharge of low/high temperature hot water in accordance with the following equation:

$$\Delta T = TS - \left( TM + TD \times \frac{dTM}{dt} \right)$$

where TD is a constant;
(5) a step of calculating the speed V of said valve on the basis of said temperature difference $\Delta T$ and said gain K in accordance with the following equation:

$V = \Delta T \times K;$ and (6) a step of controlling the driving speed of said motor in accordance with said speed V.

5. The shower apparatus as defined in claim 4, wherein said hot/cold water switch means and said gain setting means repeat the following steps:
(1) a step of judging which of low temperature hot water and high temperature hot water is to be discharged;
(2) a step of driving said motor in a direction where mixed hot water of low temperature hot water having the target temperature is discharged;
(3) a step of judging whether or not the temperature of target low temperature hot water or its approximate value is attained;
(4) a step of confirming whether the state is the hot state or the cold state when said target temperature is attained;
(5) a step of switching the state to the hot state when the hot state is not yet reached;
(6) a step of driving said motor in such a direction where mixed hot water of high temperature hot water is discharged;
(7) a step of judging whether or not the state is the cold state;
(8) a step of driving successively said motor in the direction where mixed hot water of high temperature hot water is discharged;
(9) a step of judging whether or not the state is the hot state when the target temperature of high temperature hot water or its approximate value is attained;
(10) a step of judging whether or not the state is the hot state when the target temperature of high temperature hot water or its approximate value is reached;
(11) a step of switching the state to the cold state when it is not the cold state;
(12) a step of driving said motor in the direction where mixed hot water of low temperature hot water is discharged;
(13) a step of receiving the period T' so far by said timer;

(14) a step of clearing said timer; and
(15) a step of calculating the gain K of the next period in accordance with the following equation:

$$K = T'/T \times K'.$$

6. The cold/hot water discharging apparatus as defined in claim 5, wherein the target temperature of low temperature hot water is from 25° to 30° C. and preferably from 30° C., the target temperature of high temperature hot water is from 36° to 43° and preferably 40°, and their approximate values are ±0.5° C. of the target temperatures.

7. The cold/hot water discharging apparatus as defined in claim 1 wherein the target temperature of low temperature hot water is from 25° to 30° C. and preferably from 30° C., the target temperature of high temperature hot water is from 36° to 43° C. and preferably 40° C., and their approximate values are ±0.5° C. of the target temperatures.

8. A cold/hot water discharging apparatus for charging and regulating alternately hot water of a predetermined temperature supplied from a hot water supply source to high temperature mixed water and low temperature mixed water by a cold/hot water mixing tap and supplying them to a discharge portion, said apparatus comprising:
(a) a cold/hot water mixing tap having the primary side thereof communicated with a cold water supply source and a hot water supply source and the secondary side thereof communicated with a discharge portion;
(b) a motor having a variable rotating speed variable in accordance with a control signal and driving a valve of said mixing tap to control the mixing ratio of cold/hot water;
(c) temperature detection means for detecting the temperature of mixed water, disposed on the secondary side of said mixing tap;
(d) memory means for storing the set temperatures for discharging low temperature hot water and for discharging high temperature hot water, respectively, and for storing a target period;
(e) a cold/hot water start timer, a half period time count-down timer and a period inputting count-up timer; and
(f) cold/hot water switch means for switching the set temperature to a target temperature for discharging low temperature hot water and to a target temperature for discharging high temperature hot water, comparing the mixed hot water temperature detected by said temperature detection means with one of said target temperatures set this time, and switching and setting the set temperature to the other of said target temperatures when the temperature of mixed hot water reaches said target temperature or its approximate value or when a predetermined period of time has passed;
(g) motor speed setting means for calculating the rotating speed of said motor in each of the discharge periods for discharging low temperature hot water and high temperature hot water from the difference between the mixed hot water temperature and the target temperature and from the gain, and delivering a control signal in accordance with the result of calculation; and
(h) gain setting means for calculating an optimum gain as a factor for calculating the motor speed of this period from the previous period of each of the low and high temperature hot water discharge periods, the target period, the previous temperature width, the target temperature width and the gain inputted as the calculation factor in the calculation of the motor speed in the previous period.

9. The cold/hot water discharging apparatus as defined in claim 8, wherein said valve of said mixing tap consists of a fixed disc and a movable disc superposed with said fixed disc water-tight and slidably, and said motor is capable of rotation in both normal and reverse directions and is rotated and reciprocated between a position at which high temperature hot water is discharged and a position at which low temperature hot water is discharged.

10. The cold/hot water discharging apparatus as defined in claim 8, wherein said cold/hot water discharging apparatus is used as a shower apparatus or a local washing apparatus.

11. The cold/hot water discharging apparatus as defined in claim 8, wherein said cold/hot water discharging apparatus is a shower apparatus and operates the following steps:
(1) an initial step of clearing said cold/hot water start timer, said half period time count-down timer and said period inputting count-up timer and starting the period of cold/hot water from low temperature hot water;
(2) a step of opening said valve by the operation of said motor and inputting the temperature of mixed hot water detected by said temperature detection means;
(3) a step of alternately switching the set temperature to the set temperature for discharging low temperature hot water and the set temperature for discharging high temperature hot water by said cold/hot water switch means in cooperation with said temperature detection means, and calculating the gain K of the next period in each of the periods of discharging cold/hot water by said gain setting means from the previous period T', the target period T the temperature width (T'h−T'c) of this time, the target temperature width (Th−Tc) and the gain K' in accordance with the following equation:

$$K = \left( T/T \times \frac{Th - Tc}{T'h - T'c} \times K' \right)$$

(4) a step of calculating the difference ΔT between the actual temperature TM and the target temperature TS at the time of discharge of low/high temperature hot water in accordance with the following equation;

$$\Delta T = TS - \left( TM + TD \times \frac{dTM}{dt} \right)$$

where TD is a constant;
(5) a step of calculating the speed V of said valve on the basis of said temperature difference ΔT and said gain K in accordance with the following equation:

$$V = \Delta T \times K;\text{ and}$$

(6) a step of controlling the driving speed of said motor in accordance with said speed V.

12. The cold/hot water discharging apparatus as defined in claim 11, wherein said apparatus is a shower apparatus, and repeats the following steps:
(1) a step of judging which of low temperature hot water and high temperature hot water is to be discharged;
(2) a step of driving said motor in a direction where mixed hot water of low temperature hot water having the target temperature is discharged;
(3) a step of judging whether or not the target temperature of low temperature hot water or its approximate value is attained;
(4) a step of judging whether the state is the hot state or the cold state when the target temperature or its approximate value is attained;
(5) a step of switching the state to the hot state when it is not the hot state;
(6) a step of judging whether or not the time is up for said cold/hot water start timer;
(7) a step of inputting the actual cold temperature when the time of said timer is up;
(8) a step of judging whether or not the inputted cold temperature reaches the target temperature under the cold state or its approximate value;
(9) a step of correcting the cold temperature to the target temperature when the cold temperature reaches the approximate value of the target temperature;
(10) a step of setting the half period time to said half period time count-down timer;
(11) a step of driving said motor in a direction where mixed hot water of high temperature hot water is discharged;
(12) a step of shifting the operation to said step 10 while skipping said step 9 when the cold temperature inputted at the step 8 does not attain the target temperature or its approximate value;
(13) a step of shifting the operation to the step 11 while skipping the steps 7 through 10 when the time of said start timer is not up at the step 6;
(14) a step of returning to the step 1 and after confirming whether the state is the cold state or the hot state, driving successively said motor in the direction where mixed hot water of high temperature hot water is discharged;
(15) a step of returning once again to the step 3, judging whether or not the temperature attains the target high temperature hot water temperature or its approximate value and if it does not, judging whether or not the time of said half period time set by said half period count-down timer is over;
(16) a step of switching the state to the cold state when the temperature of high temperature hot water attains the target temperature or its approximate value or when said count-down timer confirms that the half period time is over;
(17) a step of inputting the temperature of high temperature hot water under the hot state;
(18) a step of judging whether or not the temperature of high temperature hot water attains the target temperature or its approximate value;
(19) a step of correcting the temperature of high temperature hot water to the target temperature when it attains the approximate value of the target temperature;
(20) a step of setting the half period time to said half period time count-down timer;
(21) a step of shifting the operation to the step 20 while skipping the step 19 when the temperature of hot temperature hot water does not attain its target temperature or its approximate value;
(22) a step of driving said motor in the direction where mixed hot water of low temperature hot water;
(23) a step of inputting the one-period time T' from said cold/hot water period inputting count timer;
(24) a step of clearing said count-up timer;
(25) a step of calculating the gain K of the next period in accordance with the following equation:

$$K = \frac{T'}{T} \times \frac{Th - Tc}{T'h - T'c} \times K'.$$

13. The cold/hot water discharging apparatus as defined in claim 12, wherein the target temperature of low temperature hot water is from 25° to 30° C. and preferably 30° the target temperature of high temperature hot water is from 36° to 43° C. and preferably 40° C., and their approximate values are ±0.5° C. of the respective target values.

14. The cold/hot water discharging apparatus as defined in claim 8 wherein the target temperature of low temperature hot water is from 25° to 30° C. and preferably 30° C. the target temperature of high temperature hot water is from 36° to 43° C. and preferably 40° C., and their approximate values are ±0.5° C. of the respective target values.

* * * * *

UNITED STATES PATENT AND TRADEMARK OFFICE
CERTIFICATE OF CORRECTION

PATENT NO. : 4,768,705

DATED : September 6, 1988

INVENTOR(S) : Osamu TSUTSUI et al.

It is certified that error appears in the above-identified patent and that said Letters Patent is hereby corrected as shown below:

At column 3, line 55, change "much" to ---too---.
At column 4, lines 2-3, change "message" to ---massage---.
At column 6, line 17, change "numberals" to ---numerals---.
At column 6, line 26, after "3" and before "microcomputer" insert ---and the---.
At column 7, line 41, insert ---difference--- after "the" (first occurrence) and before "$\Delta T$".
At column 8, line 46, change "," to ---.---.
At column 10, line 16, change "one" to ---on---.
At column 13, line 7 (i.e., in claim 6, line 2), change "5" to ---1---.
At column 13, line 9 (i.e., in claim 6, line 5), insert ---C--- after "43$^\circ$" and before "and".
At column 13, line 9 (i.e., in claim 6, line 5), insert ---C--- after "40$^\circ$" and before ",".
At column 13, line 14 (i.e., in claim 7, line 2), change "1" to ---5---.
At column 15, line 2 (i.e., in claim 12, line 2), change "11" to ---8---.
At column 16, line 36, change "12" to ---8---.
At column 16, line 38, insert ---C.--- after "30$^\circ$" and before "the".

UNITED STATES PATENT AND TRADEMARK OFFICE
CERTIFICATE OF CORRECTION

PATENT NO. : 4,768,705

DATED : September 6, 1988

INVENTOR(S) : Osamu TSUTSUI et al.

It is certified that error appears in the above-identified patent and that said Letters Patent is hereby corrected as shown below:

At column 16, line 45, insert ---,--- after "30°C.".

Signed and Sealed this

Twenty-first Day of August, 1990

Attest:

HARRY F. MANBECK, JR.

*Attesting Officer*   *Commissioner of Patents and Trademarks*